United States Patent
Heldebrant et al.

(10) Patent No.: US 9,433,892 B2
(45) Date of Patent: Sep. 6, 2016

(54) SYSTEM AND PROCESS FOR CAPTURE OF ACID GASSES AT ELEVATED PRESSURE FROM GASEOUS PROCESS STREAMS

(71) Applicants: David J. Heldebrant, Richland, WA (US); Phillip K. Koech, Richland, WA (US); John C. Linehan, Richland, WA (US); James E. Rainbolt, Wenatchee, WA (US); Mark D. Bearden, Richland, WA (US); Feng Zheng, Richland, WA (US)

(72) Inventors: David J. Heldebrant, Richland, WA (US); Phillip K. Koech, Richland, WA (US); John C. Linehan, Richland, WA (US); James E. Rainbolt, Wenatchee, WA (US); Mark D. Bearden, Richland, WA (US); Feng Zheng, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 13 days.

(21) Appl. No.: 14/516,900

(22) Filed: Oct. 17, 2014

(65) Prior Publication Data
US 2015/0050203 A1 Feb. 19, 2015

Related U.S. Application Data

(62) Division of application No. 12/879,579, filed on Sep. 10, 2010, now abandoned.

(51) Int. Cl.
B01D 53/62 (2006.01)
B01D 53/77 (2006.01)
B01D 53/78 (2006.01)
B01D 53/96 (2006.01)
B01D 53/14 (2006.01)
B01D 53/40 (2006.01)

(52) U.S. Cl.
CPC ........... B01D 53/40 (2013.01); B01D 53/1475 (2013.01); B01D 53/1493 (2013.01); B01D 53/78 (2013.01); B01D 53/77 (2013.01); B01D 2252/20431 (2013.01); B01D 2252/30 (2013.01); B01D 2252/40 (2013.01); B01D 2257/504 (2013.01); Y02C 10/06 (2013.01)

(58) Field of Classification Search
None
See application file for complete search history.

(56) References Cited

U.S. PATENT DOCUMENTS

| 4,113,849 A | 9/1978 | Atwood |
| 4,238,206 A * | 12/1980 | Hong ............... B01D 53/1493 95/161 |
| 4,545,965 A | 10/1985 | Gazzi et al. |

(Continued)

FOREIGN PATENT DOCUMENTS

| CA | 2527144 A1 | 11/2005 |
| CA | 2539418 A1 | 3/2006 |

(Continued)

OTHER PUBLICATIONS

Jessop, P. G., et al., Nature. vol. 436, Aug. 25, 2005.

(Continued)

*Primary Examiner* — Daniel Berns
(74) *Attorney, Agent, or Firm* — James D. Matheson (57) ABSTRACT

A system, method, and material that enables the pressure-activated reversible chemical capture of acid gasses such as $CO_2$ from gas volumes such as streams, flows or any other volume. Once the acid gas is chemically captured, the resulting product typically a zwitterionic salt, can be subjected to a reduced pressure whereupon the resulting product will release the captures acid gas and the capture material will be regenerated. The invention includes this process as well as the materials and systems for carrying out and enabling this process.

5 Claims, 4 Drawing Sheets

(56) References Cited

U.S. PATENT DOCUMENTS

| | | | |
|---|---|---|---|
| 5,017,347 | A | 5/1991 | Epperly et al. |
| 5,170,727 | A | 12/1992 | Nielsen |
| 6,036,931 | A | 3/2000 | Yoshida et al. |
| 7,459,134 | B2 | 12/2008 | Cadours et al. |
| 7,799,299 | B2 | 9/2010 | Heldebrant et al. |
| 2003/0047309 | A1 | 3/2003 | Thomas et al. |
| 2004/0118749 | A1 | 6/2004 | Lesemann et al. |
| 2005/0113450 | A1 | 5/2005 | Thorarensen et al. |
| 2005/0227959 | A1 | 10/2005 | Yoshida et al. |
| 2005/0234044 | A1 | 10/2005 | Groneberg et al. |
| 2006/0004025 | A1 | 1/2006 | Brookings et al. |
| 2007/0021382 | A1 | 1/2007 | Assaf et al. |
| 2007/0255064 | A1 | 11/2007 | Szarvas et al. |
| 2008/0058549 | A1 | 3/2008 | Jessop et al. |
| 2008/0112866 | A1 | 5/2008 | Davis |
| 2008/0197084 | A1 | 8/2008 | Jessop |
| 2009/0136402 | A1 | 5/2009 | Heldebrant et al. |
| 2009/0220397 | A1 | 9/2009 | Heldebrant et al. |

FOREIGN PATENT DOCUMENTS

| | | | | |
|---|---|---|---|---|
| CA | 2527144 | A1 | 5/2007 | |
| EP | WO2008068411 | A2 | 6/2008 | |
| FR | 2909010 | A1 | 11/2006 | |
| JP | 2003261315 | A | 9/2008 | |
| WO | WO86/05474 | * | 9/1986 | ............ C01B 17/16 |
| WO | 2008/068411 | A1 | 6/2008 | |
| WO | 2008122030 | | 9/2008 | |
| WO | 2009097317 | A2 | 8/2009 | |
| WO | 2010039479 | A2 | 4/2010 | |

OTHER PUBLICATIONS

Anderson, J. L., et al., The Journal of Physical Chemistry B., vol. 110, No. 31 (2006).
Liu, Y., et al., Science, vol. 313, Aug. 18, 2006.
Huang, J., et al., Journal of Molecular Catalysis A: Chemical 279 (2008) pp. 170-176.
Siqueira, L. J., et al., The Journal of Physical Chemistry B., vol. 112 (2008).
English translation of Internal Publication No. WO2008/068411 (Jun. 12, 2008), Dec. 15, 2015.
Partial International Search Report/Written Opinion for PCT/US2009/032208 (Jun. 3, 2009), Dec. 15, 2015.
Wu, W., et al., Desulfurization of Flue Gas: SO2 Absorption by an Ionic Liquid**, Angewandte Chem. Int. Ed., 2004, 43, 2415-2417.
Heldebrant, D. J., et al., CO2-binding organic liquids (CO2BOLs) for post-combustion CO2 capture, Energy Procedia 1 (2009) 1187-1195.
Heldebrant, D. J., et al., Reversible Uptake of COX, CS2, and SO2: Ionic Liquids with O-Alkylxanthate, O-Alkythiocarbonyl, and O-alkysulfite Anions.
Jessop, P. G., et al., Reversible nonpolar-to-polar solvent, Nature, vol. 436, Aug. 25, 2005, 1102.
Anderson, J. L., et al., Measurement of SO2 Solubility in Ionic Liquids, The Journal of Physical Chemistry B, vol. 110, No. 31, 2006, 15059-15062.
Liu, Y., et al., Switchable Surfactants, Science, vol. 313, Aug. 18, 2006, 958-960.
Huang, J., et al., Tuning ionic liquids for high gas solubility and reversible gas sorption, Journal of Molecular Catalysis A: Chemical, 279, 2008, 170-176.
Siqueira, L.J., et al., Shielding of Ionic Interaction by Sulfur Dioxide in an Ionic Liquid, The Journal of Physical Chemistry B, vol. 112, 2008, 6430-6435.
Partial International Search Report/Written Opinion for International Application No. PCT/US2009/032208, International Filing Date Jan. 28, 2009, Date of Mailing Jun. 3, 2009.
Wu, W., et al., Desulfurization of Flue Gas: SO2 Absorption by an Ionic Liquid*, Angewandte Chem. Int. Ed, 2004, 43, 2415-2417.
Heldebrant, D. J. et al., CO2-binding organic liquids (CO2BOLs) for post-combustion CO2 capture, Energy Procedia I, 2009, 1187-1195.
Heldebrant, D. J., et al., Reversible Uptake of COX, CS2, and SO2; Ionic Liquids with O-Alkylxanthate, O-Alkythiocarbonyl and O-alkysulfite Anions, Chem. Eur. J., 15, 2009, 7619-727.
Yuan, X. L., et al., Hydroxyl Ammonium Ionic Liquids: Synthesis, Properties, and Solubility of SO2, J. Chem. Eng. Data, 2007, 52, 596-599.
Kidnay, A. J., et al., Fundamentals of Natural Gas Processing, CRC Press, Taylor & Francis Group, Boca Raton, FL, 2006, 100-113.

* cited by examiner

Fig. 7

SYSTEM AND PROCESS FOR CAPTURE OF ACID GASSES AT ELEVATED PRESSURE FROM GASEOUS PROCESS STREAMS

CROSS REFERENCE TO RELATED APPLICATIONS

This is a Divisional application of U.S. patent application Ser. No. 12/879,579 filed 10 Sep. 2010.

STATEMENT REGARDING RIGHTS TO INVENTION MADE UNDER FEDERALLY-SPONSORED RESEARCH AND DEVELOPMENT

This invention was made with Government support under Contract DE-AC05-76RLO1830 awarded by the U.S. Department of Energy. The Government has certain rights in the invention.

FIELD OF THE INVENTION

The present invention relates generally to organic solvents that perform (pressure activated) chemically selective capture of acid gases from gaseous product streams in the absence of water. More particularly, the invention is a system and process for capture of $CO_2$ at elevated pressure from gaseous process streams.

BACKGROUND OF THE INVENTION

Acid gases such as carbon dioxide have been implicated as major and rapidly expanding contributors to climate change over the last decade. As such, significant effort has been applied to the capture and sequestration of carbon dioxide ($CO_2$). $CO_2$ capture from pre-combustion, post-combustion, and flue gas sources, as well as contained human living space environments (e.g., submarines). Many of these existing systems utilize aqueous solutions containing primary, secondary or tertiary alkanolamines such as monoethanolamine (MEA) or methyl diethanolamine (MDEA) that chemically react with $CO_2$ and water to form thermally stable bicarbonate salts. However, aqueous solutions containing these capture agents have a low capture capacity (~7 wt %) and thus readily reach saturation. Additionally, these aqueous solutions are generally corrosive to steel and other common materials of construction. This corrosivity limits the alkanolamine concentration in water and requires the use of corrosion inhibitors. The limited alkanolamine concentration requires higher circulation rates and more energy expenditure for acid gas capture than would otherwise be necessary.

Physical absorbents are also commonly used as $CO_2$ capture agents, but are known to have a low selectivity for $CO_2$ unless $CO_2$ pressures are very high and the gas stream has a large amount of $CO_2$. These physical sorbents are often times irreversible or regenerable only after significant thermal or chemical treatment. Non-amine based capture agents including, e.g., polyethylene glycol (e.g., Selexol®), cryogenic methanol (e.g., Rectisol®), and N-methylpyrrolidone (e.g., Purisol®) also capture $CO_2$ via physical adsorption by dissolution into the liquid. However, these sorbents typically suffer from low weight capture capacities (<10 wt %) and are typically used at total gas pressures near 600 psig (41.2 atm). See *Fundamentals of Natural Gas Processing*, Arthur Kidnay & William Parrish, CRC Press, Boca Raton, Fla. pages 100-104, 110-113. Accordingly, new approaches are needed that solve $CO_2$ selectivity and capacity issues associated with conventional capture agents and adsorbent technologies. The present invention meets these needs.

SUMMARY OF THE INVENTION

The present invention provides a system, method and materials that enable the pressure-activated reversible chemical capture of acid gasses such as $CO_2$ from gas volumes such as streams, flows or any other volume. Surprisingly, treating a dry gas stream using neat alkanolamines greatly increases the capture capacity of the amine and reduces the energy required for regeneration. In the case of $CO_2$, contact with the resulting product is typically but not always limited to a zwitterionic salt, that can be subjected to a reduced pressure whereupon the resulting zwitterions decompose and release the captured $CO_2$ thereby regenerating the alkanol to its original active state. Surprisingly the zwitterionic salt like analogous ionic liquids has a disproportionately high solubility for $CO_2$ compared to aqueous solutions of alkanolamines, thus reducing the amount of these compounds need to capture a given quantity of $CO_2$. This invention includes this process as well as the materials and systems for carrying out and enabling this process.

In one embodiment the process involves contacting a gaseous volume containing $CO_2$ with at least one $CO_2$ binding organic compound containing a neat (water free) tertiary alkanolamine that chemically binds $CO_2$ to form a zwitterionic product at a pressure greater than ambient pressure, preferably greater than 100 psig; and removing the zwitterionic product from the gaseous stream or volume. If desired the zwitterionic product can then be subjected to a reduction in pressure to release the chemically bound $CO_2$ and regenerate the $CO_2$ binding organic compound.

Equipment used for the gas liquid contact to absorb the acid gases from the bulk gas stream may include gas/liquid counterflow absorption vessels containing an arrangement of trays, packing material, spray nozzles, and liquid distributors. Other examples are concurrent contactors such as Venturi scrubbers, spray towers; compact devices such as Higee contactors, or emulsifiers. Thus, this invention can incorporate any systems that can be used for efficient gas liquid contact. Similarly, for fluid regeneration and separation of acid gas from the capture agent, pressure letdown valves, flash tanks, centrifugal devices, mist eliminators, and similar equipment used for separation of the acid gas from the liquid capture agent can be used.

Depending upon the exact desires of the user a variety of modifications and alterations to this general embodiment may be had. In one embodiment the binding organic compound is a liquid, selected from the group consisting of: N,N-Dimethylethanolamine (DMEA); N,N-Diethylethanolamine (DEEA), N,N-Diisopropylethanolamine (DIPEA); 2-(dimethylamino)-2-methyl-1-propanol (2-DMAM-PrOH); and combinations thereof. In some applications the zwitterionic product is an alkylcarbonate.

In another embodiment binding $CO_2$ in said gaseous volume or stream includes using at least one $CO_2$ binding organic compound containing a primary or secondary alcohol and a neat tertiary amine that when mixed, chemically binds $CO_2$ in said volume or stream to form a zwitterionic alkylcarbonate product that removes the $CO_2$ from the volume or stream.

A system for performing these methods includes at least one acid gas binding organic compound (in the absence of water) that forms a zwitterionic product when contacted by an acid gas at a pressure above ambient that chemically binds and removes the acid gas from the volume. In one embodiment of the invention the acid gas binding organic liquid is an amine, preferably an alkanolamine. Examples of acid gas binding organic compounds include tertiary alkanolamines like N,N-Dimethylethanolamine (DMEA); N,N-Diethylethanolamine (DEEA), N,N-Diisopropylethanolamine (DIPEA); 2-(dimethylamino)-2-methyl-1-propanol (2-DMAM-PrOH); or other types of alkanolamines. These materials form zwitterionic products such as salts and alkylcarbonates. In addition to these materials various alcohols and or polar/aprotic non-aqueous solvents such as but not limited to dimethylsulfoxide, dimethylformamide, acetone, may also be included.

A preferred example of the material utilized as the reversible acid gas capture agent has the structure: Wherein n is any carbon-based chain and R and $R_2$ are any carbon-based chain or carbon containing alcohol. The reversible acid gas capture agent reverts between a non-ionic form in the absence of $CO_2$ to an ionic alkylcarbonate in the presence of $CO_2$ under elevated pressures. The general reaction is shown below:

Various advantages and novel features of the present invention are described herein and will become further readily apparent to those skilled in this art from the following detailed description. In the preceding and following descriptions we have shown and described only one preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In one embodiment of the present invention a material, system and process for pressure reversible selective chemical binding of $CO_2$ is described. This invention allows the $CO_2$ to be chemically bound at a pressure greater than ambient (STP) conditions and to be released by lowering the pressure. This pressure swing release enables the capture material to be regenerated to future use in a much more simplistic way than in other applications that currently exist in the prior art. In one exemplary embodiment neat alkanolamines are utilized to form a low molecular weight hybrid (chemical and physical) $CO_2$ scrubber that chemically captures $CO_2$ and regenerates the capture agent using a pressure-swing, providing an attractive gas capture system from the vantage point of chemical selectivity, weight capacity, and non-thermal regeneration. The chemical selectivity provided by the invention for capture of $CO_2$ is coupled with the ease and energy savings provided by pressure reversal for release and recovery of $CO_2$.

The invention could be utilized in a variety of applications including natural gas sweetening (decontamination) and other $CO_2$ scrubbing processes. Because $CO_2$ scrubbing processes from natural gas operate under elevated pressures, e.g., from about 300 psi to about 1,000 psi. the ability to absorb $CO_2$ at these elevated pressures combined with facile release at standard temperature and pressure (STP) constitutes a model technique for capture and recovery of $CO_2$ from such sources. Further, the ability to release $CO_2$ under pressure saves money for compression costs for sequestration. The invention provides the first pressure-reversible zwitterionic liquid that can provide direct replacement for conventional $CO_2$ capture processes. Two embodiments of the invention are described hereafter.

In one embodiment, organic $CO_2$ binding liquids containing neat tertiary alkanolamines include both amine and alcohol functionalities in a single structural moiety (i.e., single component systems). Single organic $CO_2$ binding liquid systems are preferred over dual component systems described hereafter containing an amine and an alcohol as separate compounds due to their lower vapor pressures, which are better suited to industrial applications. However in other applications other configurations may be desired and appropriately created.

FIG. 1(a)-1(d) shows exemplary structure of tertiary alkanolamines that capture $CO_2$ at elevated pressures. Exemplary tertiary alkanolamines include, but are not limited to, e.g., N,N-Dimethylethanolamine (DMEA), N,N-Diethylethanolamine (DEEA), N,N-Diisopropylethanolamine (DIPEA) and 2-(dimethylamino)-2-methyl-1-propanol (2-DMAM-PrOH). These liquid compounds are available commercially. Neat N,N-Dimethylethanolamine (DMEA) shows marked $CO_2$ capture capacity and is expected to be an efficient $CO_2$ capture agent for industrial applications.

Figure 1A:
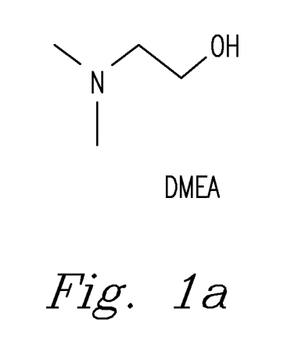
FIGS. 1a-1d show exemplary materials for use in system and process of the present invention.
Figure 1B:
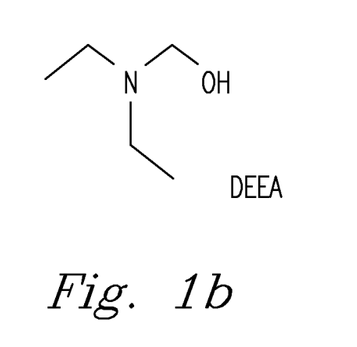
Figure 1C:
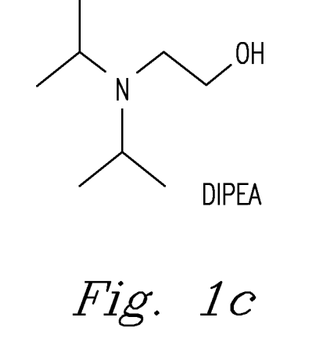
Figure 1D:
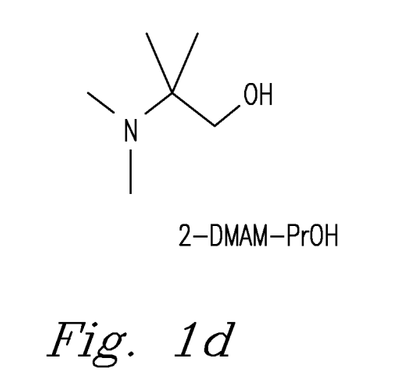
Figure 2:
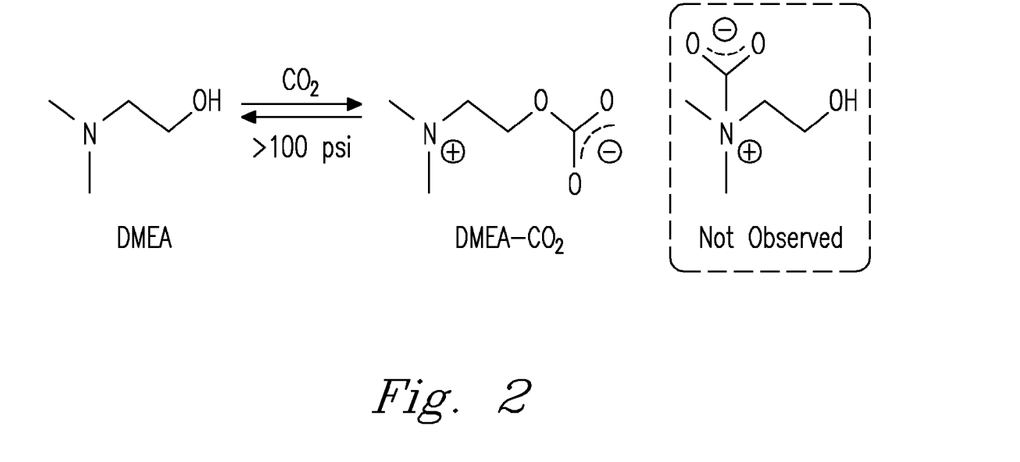
FIG. 2 is a single component system showing chemical reaction between an exemplary tertiary alkanolamine and $CO_2$ at elevated $CO_2$ pressure.

FIG. 2 shows the reaction scheme of a single component system involving the chemical reaction between an exemplary tertiary alkanolamine (DMEA) with $CO_2$ at elevated $CO_2$ pressure in the absence of water. Ethanolamines tested in conjunction with the invention were purified via distillation and dried/stored over 3 Å molecular sieves to remove water. To investigate the STP binding efficiency of ethanolamines, neat solutions of each were bubbled with $CO_2$ for 1 hour. $^{13}$C-NMR and conductivity experiments allow for quantitative and qualitative measure of DMEA absorption of $CO_2$, both chemical and physical, as well as regeneration of the DMEA from the bound form (DMEA-$CO_2$) upon simple depressurization.

Figure 3:
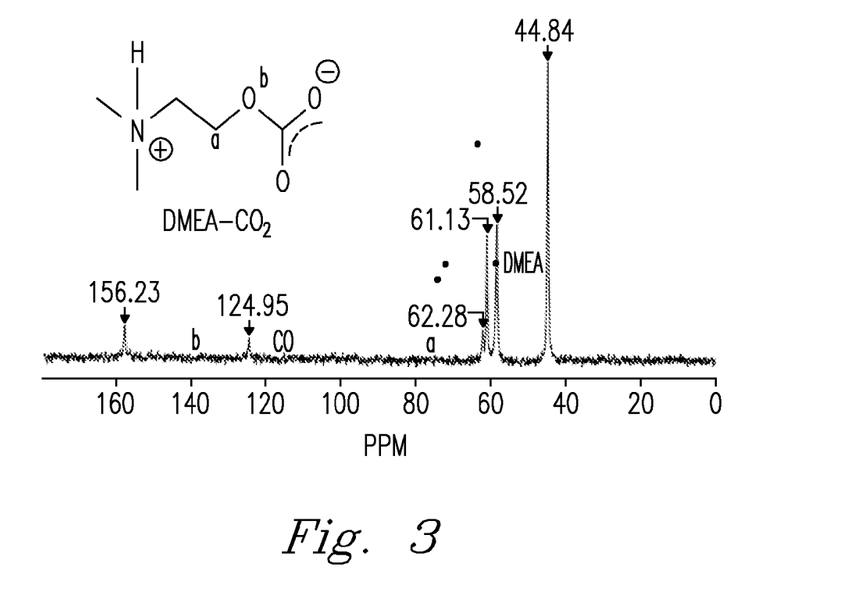
FIG. 3 is a $^{13}C$ NMR spectrum of a DMEA solution showing formation of a zwitterionic DMEA-$CO_2$ alkylcarbonate species.

FIG. 3 shows a typical $^{13}$C-NMR spectrum of a DMEA solution showing formation of a zwitterionic DMEA-$CO_2$ alkylcarbonate species, evidenced by peaks positioned at 125 ppm and between 156 and 158 ppm, respectively, which are attributed to: 1) dissolved $CO_2$ and 2) a zwitterionic alkylcarbonate DMEA-$CO_2$ moiety, respectively. The $^{13}$C NMR spectrum of this solution shows peaks at 125 ppm and 156 ppm, which are attributed to dissolved $CO_2$ and the zwitterionic alkylcarbonate DMEA-$CO_2$ (shown in FIG. 2), respectively. Under STP conditions, none of these materials in the absence of water absorbed $CO_2$, physically or chemically at standard temperature and pressure, as determined by gravimetric uptake and/or $^1H/^{13}C$ NMR spectroscopy. At elevated pressures (100-500 psi), however, DMEA successfully captures $CO_2$ via two modes simultaneously: chemical binding as the zwitterion, DMEA-$CO_2$, and physical absorption.

Figure 4:
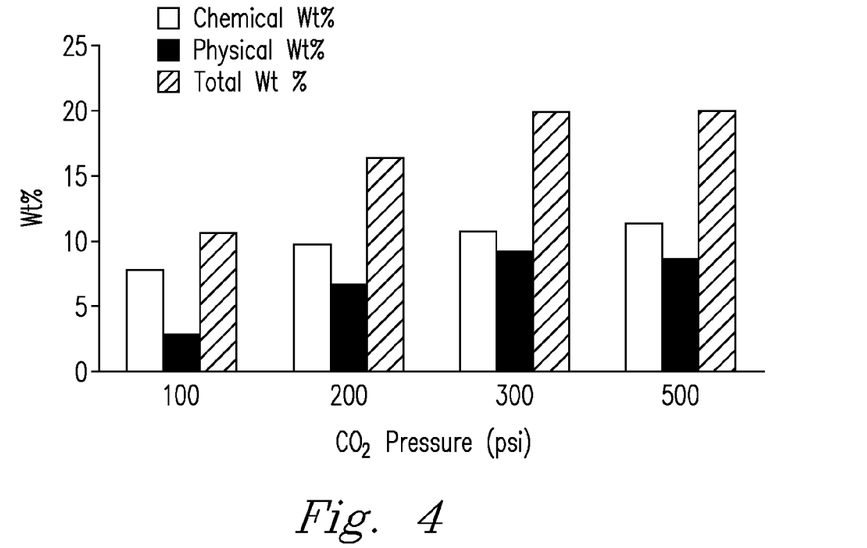
FIG. 4 shows the chemical and physical uptake of $CO_2$ in neat DMEA solution as a function of pressure.

FIG. 4 shows the chemical and physical wt % of $CO_2$ uptake in neat DMEA solution as a function of pressure. TABLE 1 lists calculated values for chemical carboxylation and physical absorption as a function of pressure.

TABLE 1

Carbon dioxide uptake in neat DMEA at various pressures.

| Material | $CO_2$ pressure (psi)/(MPa) | Chemical absorption[a] $X_{CO2}{}^c$ | wt. % | Physical absorption[a,b] $X_{CO2}{}^c$ | wt. % | Total mole % | wt. % |
|---|---|---|---|---|---|---|---|
| DMEA | 100/0.69 | 0.169 | 7.7% | 0.060 | 2.9% | 22.9% | 10.6% |
|  | 200/1.38 | 0.218 | 9.7% | 0.145 | 6.7% | 36.3% | 16.4% |
|  | 300/2.07 | 0.244 | 10.7% | 0.204 | 9.1% | 44.8% | 19.9% |
|  | 500/3.45 | 0.260 | 11.4% | 0.191 | 8.6% | 45.1% | 20.0% |

[a]calculated from $^{13}$C NMR integrations of pressurized reactions; values are the average to two experiments.
[b]moles or grams of physically absorbed $CO_2$ divided by the sum of absorbed $CO_2$, DMEA and DMEA-$CO_2$.
[c]mole fraction.

Chemical carboxylation was calculated by integration of the relative-$CH_2O$— carbons of DMEA-$CO_2$ and DMEA, respectively. In the figure, formation of the DMEA-$CO_2$ moiety increases as a function of applied gas pressure. Results in TABLE 1 show that DMEA chemically captures up to 7.7 wt. % carbon dioxide at pressures as low as 100 psi and 9.7, 10.7 and 11.4 wt. % at 200, 300 and 500 psi respectively. Physically absorbed $CO_2$ also increases with increased gas pressure, exhibiting 2.9 wt. % at 100 psi to 6.7, 9.1 and 8.6 wt. % at 200, 300 and 500 psi, respectively. Because carbon dioxide shows relatively high solubility in ionic liquids and zwitterionic liquids, increasing the ionic nature of the DMEA/DMEA-$CO_2$ moieties in solution at higher pressures may facilitate physical $CO_2$ absorption.

As shown in TABLE 1 and in FIG. 4, at 100 psi the amount of physically absorbed $CO_2$ is approximately one-third that of the chemically absorbed $CO_2$. At elevated pressures, the same ratio (physical absorbed?) is two-thirds or higher. The combined chemical/physical $CO_2$ capacity of DMEA is 10.6 wt. % at 100 psi followed by a significant jump to 16.4, 19.9 and 20 wt. % at 200, 300 and 500 psi, respectively. For reference, $CO_2$ capacities were compared with $CO_2$ capacities from conventional capture agents including, e.g., dimethyl (poly)ethylene glycol DEPEG, because of the similarity of DEPEG to SELEXOL®. TABLE 2 compares capture capacities for uptake of $CO_2$.

TABLE 2

Comparison of the $CO_2$ uptake capacities of DMEA and DEPEG, a Selexol ™ derivative.

| | Total $CO_2$ Absorption | | | |
|---|---|---|---|---|
| $CO_2$ pressure | DMEA | | DEPEG[a] | |
| (psi) | $X_{CO2}{}^b$ | wt. % | $X_{CO2}{}^b$ | wt. %[c] |
| 100 | 0.229 | 10.6% | 0.18 | 3% |
| 200 | 0.363 | 16.4% | 0.29 | 5% |
| 300 | 0.448 | 19.9% | 0.37 | 7% |
| 500 | 0.451 | 20.0% | 0.55 | 13% |

[a]Data taken/calculated from Gainar et al. (*Fluid Phase Equilibr.*, 1995, 109, 281).
[b]mole fraction.
[c]Estimated from average molecular weight of mixture.

As shown in the table, at lower pressures (≤300 psi), DMEA absorbs appreciably more $CO_2$ than DEPEG per mole of solvent while at 500 psi DMEA shows evidence of an absorbance plateau. DMEA exhibits a substantial capacity advantage for $CO_2$ over DEPEG (1.5× to 3.5×) at lower pressures. Thus mole capacities of DMEA rival those of DEPEG, a Selexol® derivative, at pressures ≤300 psi, while the weight capacities of DMEA is higher than those of DEPEG up to 500 psig. While results show DMEA is limited to ~20 wt. % $CO_2$ uptake, this feature adds to the utility of the material. As the zwitterionic salt remains dissolved in the DMEA solution (~3:1 ratio of DMEA:DMEA-$CO_2$ at a chemical mole fraction of 0.26), overall solution viscosity remains relatively low such that the mixture can be pumped through capillary tubes with diameters as small as 300 µm. Further, when DMEA/DMEA-$CO_2$ solutions are depressurized, rapid decarboxylation occurs and the mixture cleanly and easily reverts to DMEA. This is evident by the disappearance of the alkylcarbonate and dissolved $CO_2$ peaks and persistence of the DMEA signals in $^{13}$C NMR spectroscopy. Thus, DMEA represents a $CO_2$ sorbent which effectively absorbs $CO_2$ both chemically and physically under pressure and successfully decarboxylates at STP to yield DMEA, avoiding the need for costly thermal regeneration.

Of the chemical and physical absorption of $CO_2$ into DMEA, only chemical reaction leads to a solution whose conductance is significantly altered. Effect of chemical $CO_2$ addition on solvent polarity was measured by the conductivity of DMEA over a $CO_2$ atmosphere at various pressures. Anhydrous DMEA showed a conductance of 3 µS/cm when introduced to a high-pressure conductance cell. The cell was pressurized with $CO_2$ at 15 psi increments and the solution conductance was recorded.

Figure 5:
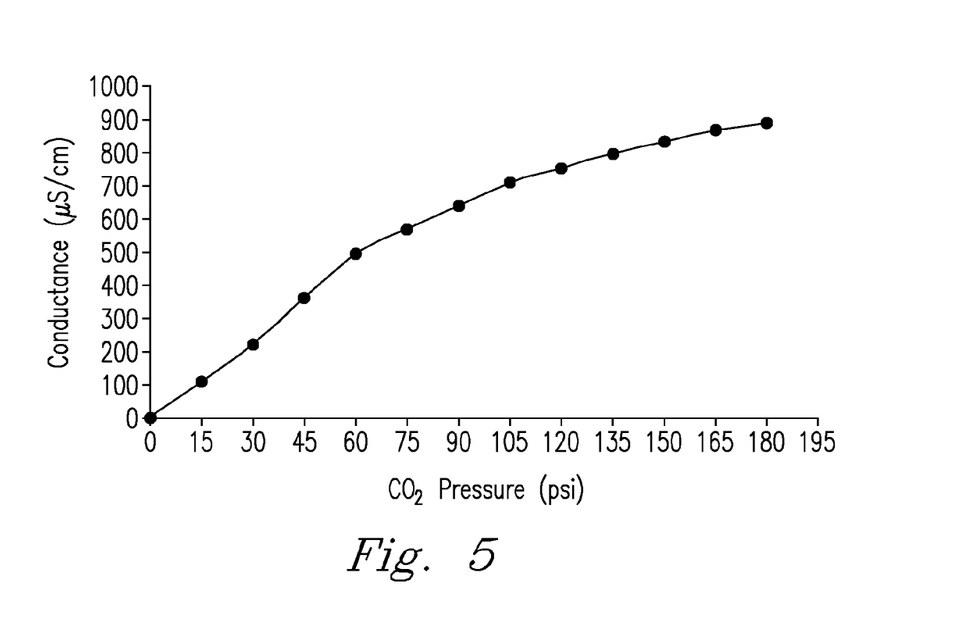
FIG. 5 plots conductance values in DMEA solution as a function of $CO_2$ pressure.

FIG. 5 plots conductance values in a DMEA solution as a function of $CO_2$ pressure. Diffusion and/or chemical addition of $CO_2$ into DMEA proved slow at low pressures; at 15 psi, vigorous stirring for 18 hours was required to reach chemical equilibrium (i.e., established by an unvarying conductance). However, equilibrium was attained more rapidly at higher pressures, an observation attributed to physical $CO_2$ saturation reached at lower pressures. At a pressure of from 45 psi to 60 psi, about 3.5 hours was required to reach equilibrium; less than 30 minutes was needed to reach equilibrium at pressures of 150 psi, 165 psi, and 180 psi. Conductance of the solution rose from 3 µS/cm to 890 µS/cm at $CO_2$ pressures from 0 psi to 180 psi. At each pressure increase, temperature of the cell briefly increased by 3° C. to 6° C., indicating the chemical fixation of $CO_2$ by DMEA is slightly exothermic or the heat of dissolution is exothermic. The significant increase in conductance as a function of pressure confirms that the interaction of DMEA with $CO_2$ involves a chemical reaction to form an ionic species and not simply a physical dissolution.

Figure 6:
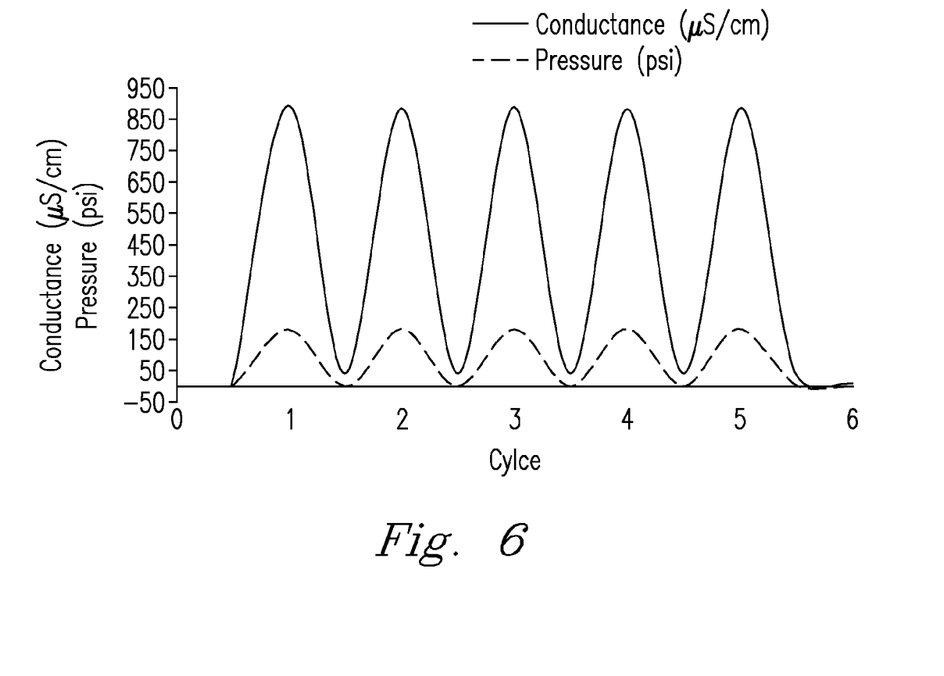
FIG. 6 plots the conductance of DMEA as a function of $CO_2$ under repeated contact at pressures from 0 to 180 psi.

The ability to regenerate DMEA was also tested. Anhydrous DMEA was carboxylated with $CO_2$ at a pressure of 180 psi and depressurized over five cycles. FIG. 6 plots the conductance of DMEA for the repeated contacts with $CO_2$ at pressures ranging from 0 to 180 psi. As shown in the figure, conductance of the DMEA:DMEA-$CO_2$ solution for each cycle repeatedly reaches 890 µS/cm (±4 µS/cm) at 180 psi and falls to 42 µS/cm (±3 µS/cm) at 0 psi. A small residual conductance (42 µS/cm) observed at the end of each cycle was reduced to 7 µS/cm following an $N_2$ purge of the solution, confirming that complete chemical decarboxylation can easy be achieved. These conductance measurements yield no discernable deterioration in the chemical $CO_2$-binding uptake capacity of DMEA from repeated carboxylation/decarboxylation cycles. While this experiment does not unambiguously verify repeatable physical carbon dioxide uptake by DMEA, we surmise that gaseous dissolution remains unchanged after numerous cycles based on the chemical uptake repeatability. TABLE 3 compares carboxylation properties of DMEA, DEEA, DIPEA, and 2-DMAM-PrOH, respectively.

2-DMAM-PrOH) exhibit distinctly different carboxylation properties under similar conditions.

Increasing the functionalization of the amine moiety with electron-donating substituents that increase basicity was found to decrease the chemical binding capacity for $CO_2$. For example, results show chemical binding of $CO_2$ decreases from DMEA to DEEA to DIPEA by from about 4 to 5 mole % each. While chemical binding of $CO_2$ is observed for 2-DMAM-PrOH, $CO_2$ pressurization of this low melting point (mp=19-20° C.) liquid results in partial solidification that precludes accurate measurement of $CO_2$ uptake capacities via NMR spectroscopy. To account for the decreasing chemical binding trend for $CO_2$ of DMEA>DEEA>DIPEA, relative polarity effects of these solvents were considered. As described herein, chemical binding of $CO_2$ by DMEA, DEEA, or DIPEA results in the formation of highly polar zwitterions, whereas the organic solvents themselves have relatively low polarities. Stabilization of the polar, highly charged zwitterions is thus impacted by the intrinsic polarity of the solvent medium. TABLE 4 lists absorption maxima for Reichardt's dye used as a molecular probe (given its acute absorption maximum sensitivity to small polarity changes) to assess polarity in the

TABLE 3

Carbon dioxide uptake by anhydrous alkanolamines at elevated pressures (25° C.).

| Material | $CO_2$ (psi) | Chemical[a] $X_{CO2}{}^b$ | wt. % | Physical[a,c] $X_{CO2}{}^b$ | wt. % | Total wt. % | Select $^{13}$CNMR signals (ppm)[d] |
|---|---|---|---|---|---|---|---|
| DMEA | 300 | 0.244 | 10.7% | 0.204 | 9.1% | 19.8% | 62.3 (—$CH_2OCO_2$—), 156.23 (—OC(O)O—) |
| DEEA | 300 | 0.209 | 7.2% | 0.223 | 8.7% | 15.9% | 62.7 (—$CH_2OCO_2$—), 158.5 (—OC(O)O—) |
| DIPEA | 300 | 0.140 | 4% | 0.430 | 12% | 16% | 66.1 (—$CH_2OCO_2$—), 159.1 (—OC(O)O—) |
| 2-DMAM-PrOH | 300 | —[e] | —[e] | —[e] | —[e] | —[e] | 70.0 (—$CH_2OCO_2$—), 158.5 (—OC(O)O—) |

[a]calculated from $^{13}$C-NMR integrations of pressurized reactions; values are the average to two experiments.
[b]mole fraction.
[c]moles/grams of physically absorbed $CO_2$ divided by the sum of absorbed $CO_2$, chemically bound alkanolamine and free alkanolamine.
[d]referenced to dissolved $CO_2$ set at 125 ppm except for 2-MDMA-PrOH.
[e]could not be determined; see text for details.

As shown in TABLE 3, DMEA shows significant $CO_2$ uptake at pressures from 100 psi to 500 psi. Other alkanolamines listed in the table (e.g., DEEA, DIPEA and DMEA, DEEA, and DIPEA media measured using UV-VIS spectroscopy, along with absorption maxima in other common organic solvents.

TABLE 4

Absorption maxima of Reichardt's dye in alkanolamines DMEA, DEEA and DIPEA and select common organic solvents.

| Solvent | TOL | CH2Cl2 | DIPEA | CH3CN | DEEA | i-PrOH | DMEA | EtOH | MeOH |
|---|---|---|---|---|---|---|---|---|---|
| Reichardt's dye, λmax (nm) | 806 | 692 | 624 | 617 | 605 | 592 | 580 | 550 | 516 |

⟶ increasing polarity ⟶

DMEA (with the smallest N-substituents) is the most polar of the selected alkanolamines, followed by DEEA, and then DIPEA, whose bulkier aliphatic N-substituents decrease the polarity of the solvent. The increasing chemical binding capacity for $CO_2$ of DMEA>DEEA>DIPEA is attributed to more effective stabilization of the corresponding zwitterionic alkylcarbonate associated with the increasing solvent polarity. This stabilizing polarity effect overshadows the basicity effect of the alkanolamines, highlighting an important principle for these types of liquids with regard to chemical $CO_2$ binding capacity. For physical uptake of $CO_2$, the opposite trend is observed, with DIPEA>DEE>DMEA. $CO_2$ shows greater physical solubility in aliphatic, non-polar organic solvents than in polar media. Here the increased physical absorption of $CO_2$ in DIPEA over the more polar DMEA and DEEA is attributed to the affinity of dissolved $CO_2$ for non-polar organic solvents.

In another embodiment of the invention, a two component system for $CO_2$ capture involves a tertiary amine (e.g., triethylamine) paired with a primary or a secondary alcohol at elevated pressures (above STP) to form ammonium alkylcarbonate ionic liquids, as shown in Equations [1] and [2]:

$$CO_2 + Base + ROH \Leftrightarrow BaseH^+ ROCO_2^- \quad [1]$$

$$K_{eq} = [BaseH^+][ROCO_2^-]/P_{CO2}[Base][ROH] \quad [2]$$

Tertiary amines show little-to-no binding of $CO_2$ in combination with alcohols at STP. Thus, captured $CO_2$ can be easily stripped by depressurizing the system.

Figure 7:
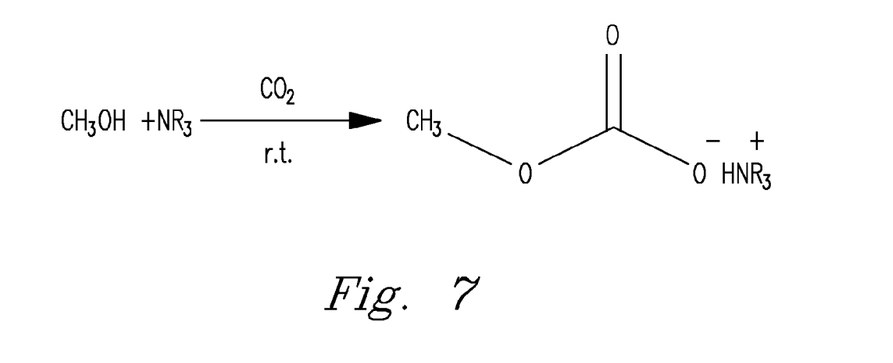
FIG. 7 shows a two component system involving reaction of an exemplary tertiary amine with a primary alcohol and $CO_2$ at elevated $CO_2$ pressure.

FIG. 7 shows the carboxylation of methanol with tertiary amines and other bases at elevated $CO_2$ pressures, e.g., near 10 atm. TABLE 5 shows the reactivity of methanol with several exemplary tertiary amines and other bases at the elevated $CO_2$ pressure of 10 atm.

TABLE 5

Carbonation of methanol with various tertiary amines

| $R_3$ | Conversion[a] | IR (C=O) cm$^{-1}$ | $^{13}$C NMR ppm | pKa (DMSO) |
|---|---|---|---|---|
| Triethylamine | 75% | 1654 | 52.3[b] 160.1[c] | 9.0 |
| Diisopropylethylamine | 92% | 1647 | 51.1 158.8 | 18.6 (MeCN) |
| DABCO[d] | 64% | 1650 | 49.1 160.0 | 8.9 |
| DMAP[e] | 64% | 1651 | 52.4 160.5 | |
| DBU[f] | 98% | 1642 | 52.2 159.8 | 24 (MeCN) |
| 2,6-Lutidine | No reaction | | | ~4 |
| Pyridine | No reaction | | | 3.4 |

[a]Conversion based on amine as determined by in situ $^{13}$C NMR of 2M base in methanol under 10 atm $CO_2$.
[b]Resonance of methyl carbon in CH$_3$OC(O)O$^-$.
[c]Resonance of carbonate carbon in CH$_3$OC(O)O$^-$.
[d]1,4-diazabicyclo[2.2.2]octane.
[e]4-(dimethylamino)pyridine.
[f]1,8-Diazabicyclo[5.4.0]undec-7-ene.

Tertiary amines produced ammonium methylcarbonate salts at a high conversion (~159 ppm $^{13}$C NMR). The alkylcarbonate peak is indicative of the chemical binding of $CO_2$ (as compares with physical dissolution, which involves a $CO_2$ peak at 125 ppm). At the pressures used in this study, there was also substantial dissolved $CO_2$ observed in the $^{13}$C NMR spectra. The strongest bases such as DBU and Diisopropylethylamine (Hünig's base) showed the highest conversion, followed by TEA, DABCO and DMAP. Hünig's base, which has the same basicity as TEA, has 17% more bound $CO_2$. DABCO and DMAP bind less $CO_2$ likely due to steric bulk. Lutidine and Pyridine showed no reactivity to form alkyl carbonates at this pressure most likely due to their much-reduced basicity compared to tertiary amines. Ammonium alkylcarbonate salts listed in TABLE 5 decompose back to the corresponding amine, methanol, and $CO_2$ upon return of $CO_2$ pressure to atmospheric conditions, however stronger bases such as DBU need thermal regeneration and do not decarboxylate upon reduction in pressure.

Carboxylations were also performed in MeCN solvent rather than methanol. TABLE 6 lists carbonation results of various alcohols with TEA and $CO_2$ in MeCN.

TABLE 6

Carboxylation of various alcohols with triethylamine and $CO_2$

| R | Conversions[a] |
|---|---|
| CH$_3$— | 75% |
| CH$_3$CH$_2$— | 75% |
| 1-octanol | 25% |
|  | 65%[b] |
|  | 35%[c] |
| i-Propanol | 25% |
| t-Butanol | No Reaction |
| Phenyl | No Reaction |

[a]Conversion based on NEt$_3$.
[b]Initial product is ClCH$_2$CH$_2$OCO$_2$—. This product cleanly cyclizes to ethylene carbonate.
[c]Reaction was performed in CH$_3$CN. Only one hydroxyl is carbonated.

Primary and secondary alcohols readily convert to corresponding alkyl carbonates, whereas tertiary alcohols do not. Results are attributed to steric crowding of the alcohol. Data also show the degree of carboxylation of the alcohol decreases as the alcohol chain length increases and subsequently becomes less polar. The decrease in polarity is attributed to the lack of a polar solvent that can stabilize the transition states of the molecules during the carboxylation process. For example, trifluoroethanol (considered to have a steric bulk equivalent with that of ethanol, but with a much lower pKa) is unreactive toward $CO_2$. Phenol doesn't carboxylate under these conditions, which is likely due to it being too acidic to bind $CO_2$. Data in TABLES 5 and 6 suggest short linear alcohols and tertiary amines are preferred combinations for a high-pressure $CO_2$ capture solvent system, but is not limited thereto.

A first challenge in designing neat trialkylamine and alcohol blends to perform capture in the absence of solvent is to use alcohols and bases that are non-volatile and to form liquid ammonium alkylcarbonates (not solids as in the case of methanol) that are cheap. We set out to find a non-volatile tertiary amine and alcohol that would mitigate material loss and improve costs. The amine and alcohol were bifunctionalized to make them less volatile. As $CO_2$ is introduced over an organic molecule, it causes volumetric expansion and a decrease in polarity as the mole fraction of $CO_2$ increases. $CO_2$ binding requires a highly polar medium to stabilize the polar transition states and the zwitterionic alkylcarbonate. Polarity data measured for alkanolamines demonstrates that a $CO_2$ pressure near 150 psi decreases the polarity. A drop in polarity promotes dissolution of $CO_2$ into the alkanolamine, not the desired chemical binding. DMEA however is sufficiently polar to stabilize these polar species and subsequently is a good candidate to react with $CO_2$ at a low pressure (i.e., 150 psi) condition.

Decomposition of the alkylcarbonate salts by depressurization is highly advantageous for high-pressure $CO_2$ gas capture as the pressure swing avoids use of an energy intensive thermal solvent regeneration cycle. The demonstrated pressure desorption of the chemically bound $CO_2$ from ammonium alkylcarbonates parallels the energy requirements for the release of physically absorbed $CO_2$ by industrial materials such as SELEXOL® and RECTISOL®. These high-pressure anhydrous alkanolamines can potentially be superior to physical sorbents because they contain the economical pressure swing yet they contain a highly chemically selective $CO_2$ capture.

The following example provides a further understanding of the invention. Dissolved $CO_2$ appears at 125 ppm in $^{13}C$ NMR spectra in multiple organic solvents while the alkylcarbonate (R—O—$CO_2$—) peak appears at 158 ppm. The carbonyl signal is attributed to the alkylcarbonate, as carbamates do not form for the tertiary amine. While primary and secondary amines can and do react with carbon dioxide to yield carbamates, tertiary amines do not react directly with $CO_2$, although bicarbonate salts can form in the presence of water. $^{13}C$ NMR chemical shifts confirm that chemical $CO_2$ binding to an alkanolamine (in the absence of water) proceeds via the alcohol moiety of DMEA as opposed to the tertiary amine. The appearance of a resolved —$CH_2O$— methylene signal at 63 ppm, downfield from the alcohol methylene of DMEA, is indicative of the effects of O-carboxylation as opposed to N-carboxylation. To investigate the extent to which DMEA will absorb $CO_2$, neat solutions of DMEA were pressurized at 100, 200, 300 and 500 psi of $CO_2$ for 18 hours, loaded into a PEEK NMR tube and analyzed. Carboxylation experiments at higher pressures were not performed as $CO_2$ begins to liquefy above 500 psi. Under these conditions $CO_2$ is likely to phase separate from the DMEA/DMEA-$CO_2$ mixture and hamper NMR interpretation. Both DMEA-$CO_2$ and dissolved $CO_2$ were observed at all pressures and the relative quantities of each calculated from $^{13}C$ NMR integrations. Extent of both chemical carboxylation and physical absorption as a function of pressure were calculated (see TABLE 1 and FIG. 4) using the relative integration of the —$CH_2O$— carbons of DMEA-$CO_2$ and DMEA. Physical absorption was found by comparing the relative integration of the carbonyl carbons of $CO_2$ and DMEA-$CO_2$.

Neat solutions of alkyl ethanolamines (DMEA, DEEA, and DIPEA) absorb and chemically bind carbon dioxide at elevated pressures by formation of alkylcarbonates. Through both chemical binding and physical absorption DMEA captures up to 45 mole % (20 wt. %) carbon dioxide, while DEEA captures up to 43 mole % (16 wt. %) and DIPEA captures up to 57 mole % (16 wt. %) carbon dioxide (300 psi). The increasing chemical uptake capacity trend of DMEA>DEEA>DIPEA is attributed to solvent polarity effects while the physical $CO_2$ absorption trend of DIPEA>DEEA>DMEA is explained by the affinity of carbon dioxide for non-polar organic media. DMEA shows the greatest wt. % uptake of carbon dioxide and chemically binds $CO_2$ under pressure more effectively than the other tertiary ethanolamines to form the thermodynamically unstable zwitterionic alkylcarbonate salt DMEA-$CO_2$. DMEA captures up to 45 mole % (20 wt. %) of $CO_2$ at 500 psi via combined chemical binding and physical absorption. Carbon dioxide weight capacities of DMEA rival those of DEPEG, a SELEXOL® derivative, at pressures ≤300 psi. DMEA-$CO_2$, DEEA-$CO_2$ and DIPEA-$CO_2$ are characterized by high-pressure $^{13}C$ NMR and give rise to $^{13}C$ resonances analogous to previously studied zwitterionic alkylcarbonates. The zwitterion DMEA-$CO_2$ regenerates $CO_2$ and DMEA upon depressurization. This natural decarboxylation when pressure is release is advantageous for high-pressure gas-capture systems as the sorbent can be regenerated by an economical pressure swing as opposed to a more costly thermal swing. Repeated $CO_2$ absorption/release experiments show no decline in the chemical binding $CO_2$ uptake capacity of DMEA over 5 cycles.

Tertiary amines combined with alcohols chemically and selectively bind $CO_2$ under mild pressures to form thermodynamically unstable alkylcarbonate salts. The carboxylations of numerous amine and alcohol pairs can be tracked in situ using IR and NMR spectroscopy. Alkanolamines also capture $CO_2$ under elevated pressures as zwitterionic alkylcarbonate salts. The degree of alcohol carboxylation is limited by the polarity of the solvent as well as the basicity of the amine. Ammonium alkylcarbonate salts decarboxylate into their corresponding alcohols and amines unless under pressures near 10 ATM. This natural decarboxylation when pressure is released is advantageous for high-pressure gas-capture systems because the sorbent can be regenerated by an economical pressure swing instead of the more costly thermal swing.

While preferred embodiments of the present invention have been shown and described, it will be apparent to those of ordinary skill in the art that many changes and modifications may be made with various material combinations without departing from the invention in its true scope and broader aspects. The appended claims are therefore intended to cover all such changes and modifications as fall within the spirit and scope of the invention.

What is claimed is:

1. A method for removing $CO_2$ from a gaseous volume comprising the steps of:
   contacting a dry gaseous stream or volume containing $CO_2$ with at least one $CO_2$ binding organic compound containing a neat (anhydrous) tertiary alkanolamine that chemically binds $CO_2$ to form a zwitterionic product at a pressure greater than 100 psi to remove $CO_2$ from said gaseous stream or volume;
   removing said zwitterionic product from said dry gaseous stream or volume; and
   depressurizing said zwitterionic product in the absence of added heat to release chemically bound $CO_2$ therefrom to regenerate said $CO_2$ binding organic compound.

2. The method of claim 1, wherein said binding organic compound is a liquid.

3. The method of claim 1, wherein said tertiary alkanolamine is selected from the group consisting of: N,N-Dimethylethanolamine (DMEA); N,N-Diethylethanolamine (DEEA), N, N-Diisopropylethanolamine (DIPEA); 2-(dimethylamino)-2-methyl-1-propanol (2-DMAM-PrOH); and combinations thereof.

4. The method of claim 1, wherein said zwitterionic product is an alkylcarbonate.

5. A method for chemically binding and removing $CO_2$ from a gaseous stream or volume comprising the steps of:
   binding $CO_2$ in said gaseous stream or volume using at least one $CO_2$ binding organic compound containing a neat tertiary alkanolamine that when mixed with a primary or secondary alcohol chemically binds $CO_2$ in said gaseous stream or volume to form a zwitterionic product that removes the $CO_2$ from said gaseous stream or volume; and depressurizing said zwitterionic product in the absence of added heat to release chemically bound $CO_2$ therefrom to regenerate said $CO_2$ binding organic compound.

* * * * *